United States Patent
Park

(10) Patent No.: US 9,264,958 B2
(45) Date of Patent: Feb. 16, 2016

(54) ELECTRONIC DEVICE AND METHOD FOR CHANGING NETWORK CONNECTION

(71) Applicant: Samsung Electronics Co., Ltd, Gyeonggi-do (KR)

(72) Inventor: Se-Hee Park, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 42 days.

(21) Appl. No.: 14/032,077

(22) Filed: Sep. 19, 2013

(65) Prior Publication Data

US 2014/0080485 A1    Mar. 20, 2014

(30) Foreign Application Priority Data

Sep. 19, 2012    (KR) .................. 10-2012-0104123

(51) Int. Cl.
*H04W 36/14*    (2009.01)
*H04W 8/18*    (2009.01)
*H04W 48/18*    (2009.01)

(52) U.S. Cl.
CPC .............. *H04W 36/14* (2013.01); *H04W 8/183* (2013.01); *H04W 48/18* (2013.01)

(58) Field of Classification Search
CPC ..... H04W 88/06; H04W 48/18; H04W 8/183; H04W 8/205; H04W 4/16; H04W 36/14; H04W 36/0083; H04W 36/30; H04B 1/3816; H04M 2250/14
See application file for complete search history.

(56) References Cited

U.S. PATENT DOCUMENTS

| | | | |
|---|---|---|---|
| 2002/0154632 A1* | 10/2002 | Wang et al. | 370/389 |
| 2007/0201394 A1* | 8/2007 | Jeon | H04W 48/18 370/318 |
| 2009/0131054 A1* | 5/2009 | Zhang | 455/436 |
| 2012/0069817 A1 | 3/2012 | Ling et al. | |
| 2012/0135715 A1* | 5/2012 | Kang et al. | 455/412.1 |
| 2013/0064176 A1* | 3/2013 | Hsu et al. | 370/328 |
| 2013/0148574 A1* | 6/2013 | Liu et al. | 370/328 |

FOREIGN PATENT DOCUMENTS

KR    10-0811521    3/2008

\* cited by examiner

*Primary Examiner* — Liton Miah

(57) ABSTRACT

An method of the electronic device for accessing different networks using at least two Subscriber Identity Module (SIM) cards includes monitoring whether the networks accessible by the at least two SIM cards include a network which satisfies a handover condition; and when detecting the network satisfying the handover condition, switching SIM card connection to one SIM card accessible to the network satisfying the handover condition among the at least two SIM cards.

18 Claims, 5 Drawing Sheets

ELECTRONIC DEVICE AND METHOD FOR CHANGING NETWORK CONNECTION

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Sep. 19, 2012, and assigned Serial No. 10-2012-0104123, the entire disclosure of which is hereby incorporated by reference.

TECHNICAL FIELD

The present disclosure relates generally to an electronic device and a method for changing network connection.

BACKGROUND

As information and communication technologies grow, functions of an electronic device also advance to satisfy user's various needs. For example, a dual Subscriber Identity Module (SIM) electronic device is developed to utilize two phone numbers in the single electronic device. The dual-SIM electronic device can allow two network services at the same time using the single electronic device and be used for business and private use with separate numbers.

However, the dual-SIM electronic device cannot accurately detect a communication status of the networks accessibly by the two SIMs. For example, when the electronic device is accessing a first network using a first SIM, the user cannot determine whether or not the communication status of a second network not being used provides better communication condition. As a result, the user cannot take advantage of the dual-SIM electronic device.

In this respect, what is needed is an apparatus for automatically accessing the network of better communication condition in the dual-SIM electronic device.

SUMMARY

To address the above-discussed deficiencies of the prior art, it is a primary aspect of the present disclosure to provide an apparatus and a method for accessing an optimal network by monitoring a network which can increase a packet service speed in real time.

Another aspect of the present disclosure is to provide an apparatus and a method for automatically accessing a network with the second greatest signal strength when network speeds make little difference.

Yet another aspect of the present disclosure is to provide an apparatus and a method for reflecting user's various situations when manually setting a network switch mode.

According to one aspect of the present disclosure, an operating method of an electronic device for accessing different networks using at least two Subscriber Identity Module (SIM) cards includes monitoring whether the networks accessible by the at least two SIM cards include a network which satisfies a handover condition, and when detecting the network satisfying the handover condition, switching SIM card connection to one SIM card accessible to the network satisfying the handover condition among the at least two SIM cards.

The at least two SIM cards may be registered to access the networks supporting different packet services.

The network satisfying the handover condition may be a network with the fastest data rate among the networks accessible by the at least two SIM cards.

The network satisfying the handover condition is a network with a greatest signal strength among the networks accessible by the at least two SIM cards.

The network satisfying the handover condition is a network with a greatest signal strength if the data rate of the networks is substantially identical.

The network may support a packet service.

A processor unit is configured not to switch the SIM card connection when a current operation is under a sleep mode.

The method may further include determining whether a network automatic switch mode is set, and determining that the network automatic switch mode is set.

The method may further include, when determining that the network automatic switch mode is not set, connecting any one SIM card selected from the at least two SIM cards, determining whether connection status of the connected SIM card changes; and when determining the connection status change, confirming the access to the network accessible by the SIM card of the changed connection status.

The method may further include, when detecting no network satisfying the handover condition, determining whether the networks accessible by the at least two SIM cards include a network with the greatest signal strength; and when detecting the network with the greatest signal strength, switching the SIM card connection to the SIM card accessible to the network with the greatest signal strength among the at least two SIM cards.

According to another aspect of the present disclosure, an electronic device for accessing different networks using at least two SIM cards includes a communication module for monitoring whether the networks accessible by the at least two SIM cards include a network which satisfies a handover condition, and a processor unit for, when detecting the network satisfying the handover condition, switching SIM card connection to one SIM card accessible to the network satisfying the handover condition among the at least two SIM cards.

The at least two SIM cards may be registered to access the networks supporting different packet services.

The network satisfying the handover condition may be a network with the fastest data rate among the networks accessible by the at least two SIM cards.

The network may support a packet service.

The processor unit may confirm that a current operation does not enter a sleep mode.

The processor unit may determine whether a network automatic switch mode is set, and determines that the network automatic switch mode is set.

The processor unit may connect any one SIM card selected from the at least two SIM cards, determine whether connection status of the connected SIM card changes, and when determining the connection status change, confirm the access to the network accessible by the SIM card of the changed connection status.

The communication module may monitor whether the networks accessible by the at least two SIM cards include a network with the greatest signal strength, and when detecting the network with the greatest signal strength, the processor unit switches the SIM card connection to one SIM card accessible to the network with the greatest signal strength among the at least two SIM cards.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. The following description with reference to the accompanying drawings is provided to assist in a comprehensive understanding of embodiments of the disclosure as defined by the claims and their equivalents. It includes various specific details to assist in that understanding but these are to be regarded as merely example. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
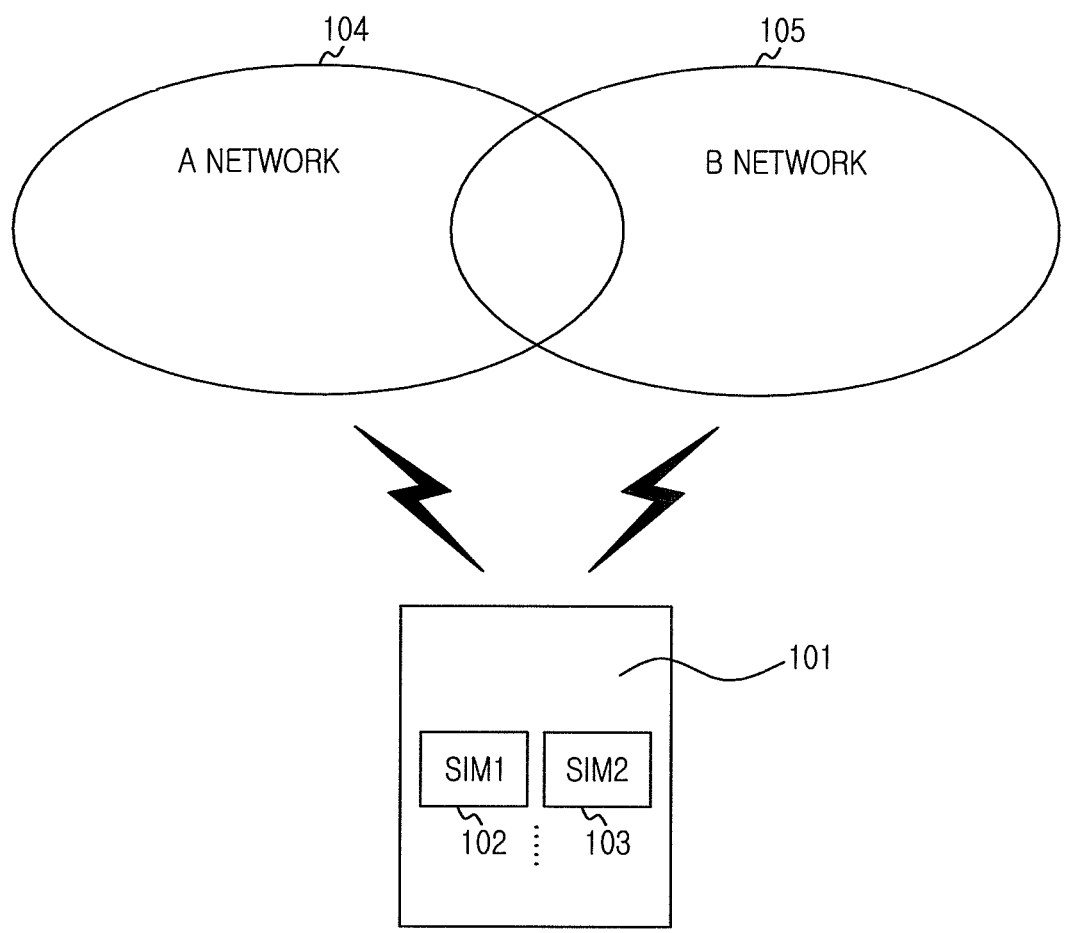
FIG. 1 illustrates an electronic device for changing network connection according to an exemplary embodiment of the present disclosure.

FIG. 1 illustrates an electronic device for changing network connection according to an embodiment of the present disclosure. The electronic device 101 can include at least two Subscriber Identity Module (SIM) cards. More specifically, the at least two SIM cards of the electronic device 101 can access their designated networks respectively. For example, it is assumed that the electronic device 101 includes two SIM cards. The first SIM card of the electronic device 101 can access a first network provided by a communication company A, and the second SIM card can access a second network provided by a communication company B. That is, advantageously, the electronic device including the multi-SIM card can designate different accessible networks per SIM card.

Referring to FIG. 1, it is assumed that the electronic device 101 includes two SIM cards 102 and 103 and can use a packet service by accessing the network A and the network B with the two SIM cards. More specifically, the electronic device 101 can use the packet service by switching the SIM card connection to the first SIM card 102 and accessing the A network of the first communication company. The electronic device 101 can use the packet service by switching the SIM card connection to the second SIM card 103 and accessing the B network of the second communication company.

First, the electronic device 101 can monitor the network with the fastest data rate in real time among the networks accessible by its at least two SIM cards. More specifically, the electronic device 101 repeats the monitoring process until its current operation enters a sleep mode. For example, when determining that the current operation does not enter the sleep mode, the electronic device 101 can monitor the network with the fastest data rate in real time among the A network 104 and the B network 105 accessible by the first SIM card 102 and the second SIM card 103. It is assumed that the electronic device 101 monitors the network with the fastest data rate and determines the fastest data rate when accessing the A network 104. On this assumption, the electronic device 101 can switch the SIM card connection from the second SIM card 103 to the first SIM card 102. Hence, the electronic device 101 can send and receive data to and from other electronic device by accessing the A network 104, and communicate with the other electronic device with high communication quality.

When determining no network with the fastest data rate, the electronic device 101 can determine whether the networks accessible by the two SIM cards 102 and 103 include the network with the greatest signal strength. More specifically, when determining that there is little difference in the data rates of the A network 104 and the B network 105 accessible by the two SIM cards 102 and 103, the electronic device 101 can determine which network exhibits the greater signal strength. Upon detecting the network with the greater signal strength, the electronic device 101 can switch the SIM card connection to one of the two SIM cards 102 and 103, which can access the network with the greater signal strength. For example, when the signal strength of the first SIM card 102 is greater than the second SIM card 103, the electronic device 101 can switch the SIM card connection from the second SIM card 103 to the first SIM card 102.

Figure 2:
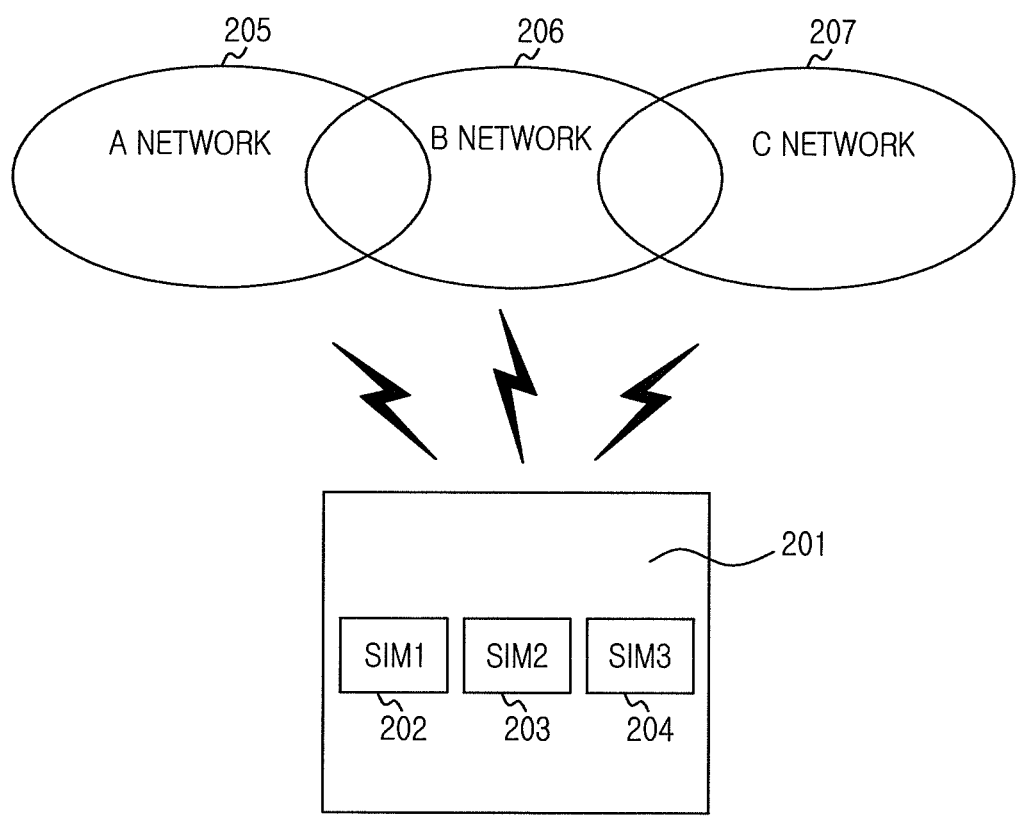
FIG. 2 illustrates access network switch according to an exemplary embodiment of the present disclosure.

FIG. 2 depicts the access network switch according to an embodiment of the present disclosure. While the electronic device can include at least two SIM cards, it is assumed here that the electronic device includes three SIM cards 202, 203, and 204. Referring to FIG. 2, it is assumed that the electronic device 201 includes the three SIM cards 202, 203, and 204, and the three SIM cards 202, 203, and 204 can access a network A, a network B, and a network C respectively. More specifically, the electronic device 201 can use the packet service by switching the SIM card connection to the first SIM card 202 and accessing the A network of the first communication company. The electronic device 201 can use the packet service by switching the SIM card connection to the second SIM card 203 and accessing the B network of the second communication company. The electronic device 201 can use the packet service by switching the SIM card connection to the third SIM card 204 and accessing the C network of the third communication company.

The electronic device 201 can monitor the network with the fastest data rate in real time among the networks accessible by its three SIM cards 202, 203, and 204. More specifically, the electronic device 201 repeats the monitoring process until its current operation enters the sleep mode. For example, when determining that the current operation does not enter the sleep mode, the electronic device 201 can monitor the network with the fastest data rate in real time among the A network 205, the B network 206, and the C network 207 accessible by the first SIM card 202, the second SIM card 203, and the third SIM card 204. It is assumed that the electronic device 201 monitors the network with the fastest data rate and determines the fastest data rate when accessing the B network 206. On this assumption, the electronic device 201 can switch the SIM card connection from the current SIM card, which is one of the three SIM cards 202, 203, and 204, to the second SIM card 203. Hence, the electronic device 201 can send and receive data to and from other electronic device by accessing the B network 206, and communicate with the other electronic device with high communication quality.

When determining no network with the fastest data rate, the electronic device 201 can determine whether the networks accessible by the three SIM cards 202, 203, and 204 include the network with the greatest signal strength. More specifically, when determining that there is little difference in the data rates of the A network 205, the B network 206, and the C network 207 accessible by the three SIM cards 202, 203, and 204, the electronic device 201 can determine which network exhibits the greatest signal strength. Upon detecting the network of the greatest signal strength, the electronic device 201 can switch the SIM card connection to one of the three SIM cards 202, 203, and 204, which can access the network with the greater signal strength. For example, when the third SIM card 204 of the three SIM cards 202, 203, and 204 exhibits the greatest signal strength, the electronic device 201 can switch the SIM card connection from the current SIM card of the three SIM cards 202, 203, and 204, to the third SIM card 204.

A conventional electronic device cannot accurately detect the communication status of the networks accessible by the two SIM cards of the electronic device. More specifically, since the electronic device cannot monitor the communication status of the networks accessible by the SIM cards in real time, it cannot access the network of the better communication condition and send data. By contrast, the present electronic device can monitor the communication status of the networks accessible by the SIM cards in real time and automatically switch the SIM card connection to the corresponding SIM card so that the electronic device can access the network of the best communication.

Figure 3:
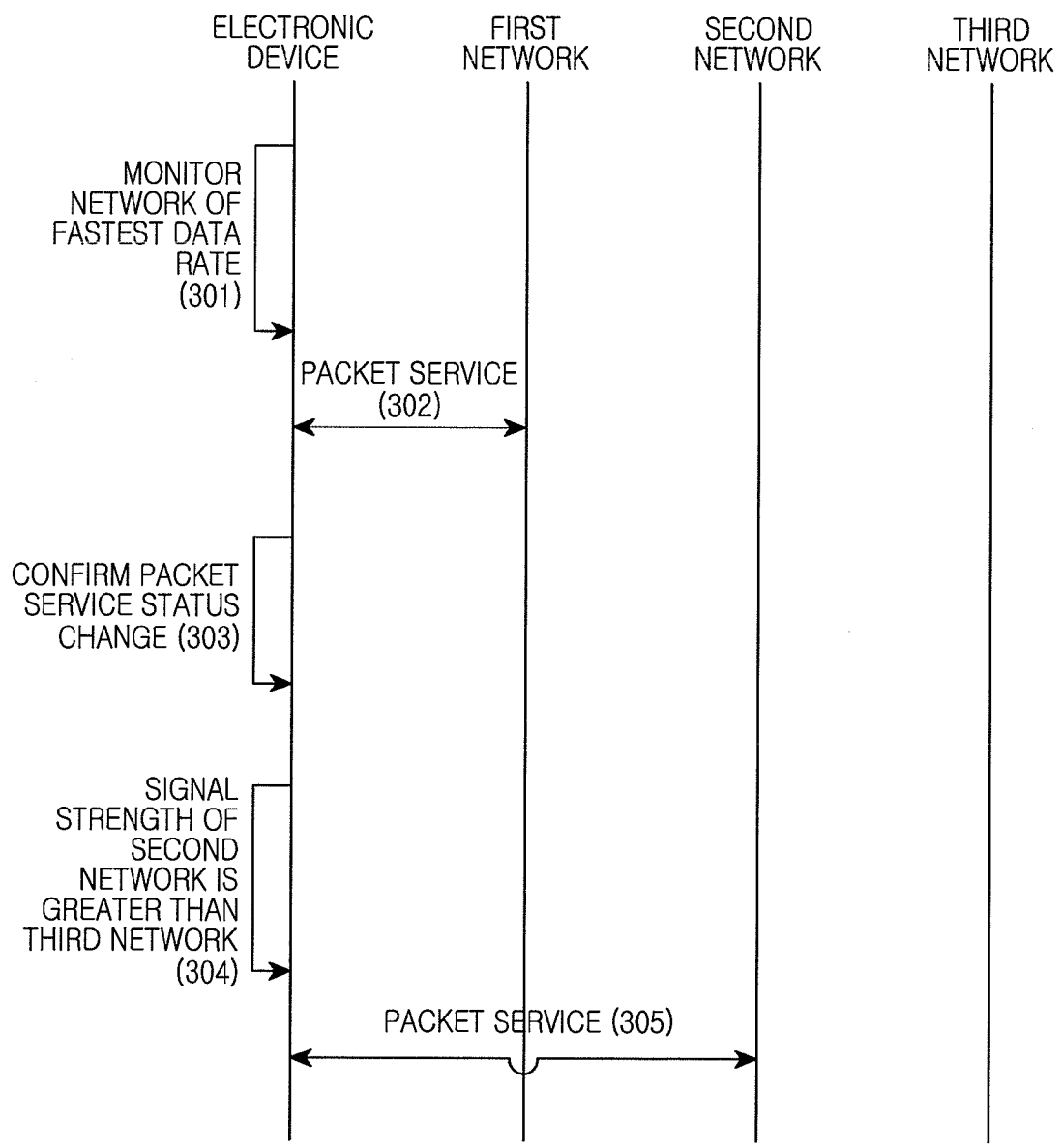
FIG. 3 illustrates network connection change according to an embodiment of the present disclosure.

FIG. 3 is flowchart of the network connection change of the electronic device according to an embodiment of the present disclosure. It is assumed that the electronic device includes the three SIM cards, and the three SIM cards can access a first network, a second network, and a third network respectively. More specifically, the electronic device can use the packet service by switching the SIM card connection to the first SIM card and accessing the first network of the first communication company. The electronic device can use the packet service by switching the SIM card connection to the second SIM card and accessing the second network of the second communication company. The electronic device can use the packet service by switching the SIM card connection to the third SIM card and accessing the third network of the third communication company.

The electronic device can monitor the network with the fastest data rate in real time among the first, second and third networks accessible by the three SIM cards in step 301. More specifically, the electronic device repeats the monitoring process until its current operation enters the sleep mode. For example, when determining that the current operation does not enter the sleep mode, the electronic device can monitor the network with the fastest data rate in real time among the first network, the second network, and the third network accessible by the first SIM card, the second SIM card, and the third SIM card.

In step 302, the electronic device can use the packet service by accessing the first network of the fastest data rate among the first, second and third networks. For example, when monitoring the network of the fastest data rate and determining the fastest data rate in the first network access, the electronic device can use the packet service by accessing the first network. More specifically, the electronic device can switch the SIM card connection from the current SIM card of the three SIM cards to the first SIM card. Accordingly, the electronic device can send and receive data to and from the other electronic device by accessing the first network, and communicate with the other electronic device with high communication quality.

The electronic device accessing the first network can confirm that the packet service status is changed in step 303. More specifically, the electronic device can keep monitoring the network of the fastest data rate among the first, second, and third networks even after the first network access. That is, the electronic device continuously monitors the network condition varying in real time and thus detects an optimal network accessible. Namely, the electronic device confirms that the first network being accessed is not the network with the fastest data rate.

Next, the electronic device can determine that the second network exhibits the greater signal strength than the third network in step 304. In detail, it is assumed that the electronic device confirms the packet service status change during the first network access and monitors the network with the fastest data rate among the first, second, and third networks, and the second and third networks exhibit the higher data rate than the first network. On this assumption, when the second network and the third network exhibit the similar data rates within a set range, the electronic device can determine which network exhibits the greater signal strength. Herein, the electronic device determines that the signal strength of the second network is greater than the signal strength of the third network.

In step 305, the electronic device can use the packet service by accessing the second network. More specifically, after accessing the first network, when determining that the signal strength of the second network is greater than the signal strength of the third network, the electronic device can send and receive data to and from the other electronic device by accessing the second network, and communicate with the other electronic device with high communication quality.

Figure 4:
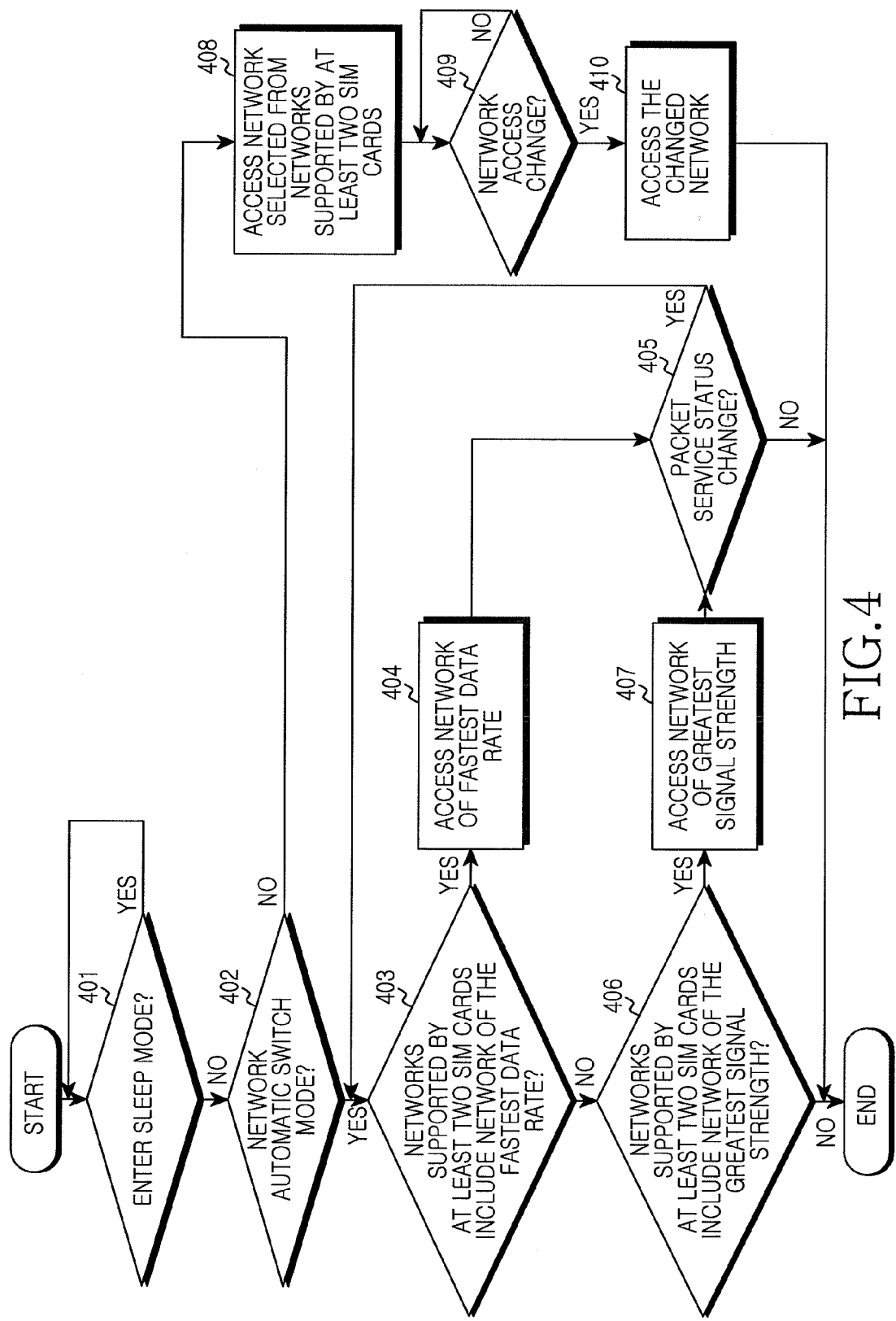
FIG. 4 illustrates operations of the electronic device according to an exemplary embodiment of the present disclosure.

FIG. 4 is a flowchart of operations of the electronic device according to an embodiment of the present disclosure. As shown in FIG. 4, the electronic device can determine whether its current operation enters the sleep mode in step 401. More specifically, before the current operation of the electronic device enters the sleep mode, the network can be switched according to the operations of the present disclosure. That is, upon entering the sleep mode, the electronic device does not automatically switch the network in order to save battery consumption.

When the current operation of the electronic device does not enter the sleep mode, the electronic device can determine whether a network automatic switch mode is set in step 402. More specifically, the electronic device can operate largely in the network automatic switch mode and a network manual switch mode. That is, when the network automatic switch mode is set, the electronic device can monitor the network with the best communication condition amongst the accessible networks in real time and automatically access the corresponding network. By contrast, when the network manual switch mode is set, the electronic device can access one of the accessible networks according to a user's selection. The electronic device of the present disclosure can receive not only the automatic switch mode but also the manual switch mode to thus allow user's various selections. For example, when the electronic device accesses an arbitrary network in the automatic switch mode, it can incur an unintended data charge to the user. In addition, the user can classify the at least two SIM cards of the electronic device into a call dedicated SIM card and a data dedicated SIM card.

When the network automatic switch mode is set, the electronic device can monitor the network with the fastest data rate among the networks supported by the at least two SIM cards in step 403. For example, provided that the electronic device includes three SIM cards, the electronic device can monitor the network with the fastest data rate in real time among the first, second, and third networks accessible by the first, second and third SIM cards.

Upon determining the network with the fastest data rate among the accessible networks, the electronic device can access the network with the fastest data rate in step 404. For example, when monitoring the network with the fastest data rate and determining the fastest data rate in the first network access, the electronic device can use the packet service by accessing the first network. More specifically, the electronic device can switch the SIM card connection from the current SIM card of the at least two SIM cards to the first SIM card. Accordingly, the electronic device can send and receive data to and from the other electronic device by accessing the first network, and communicate with the other electronic device with high communication quality.

In step 405, the electronic device can determine whether the packet service status changes. More specifically, the electronic device can keep monitoring the network with the fastest data rate among the accessible networks even after the access to the network with the fastest data rate. That is, the electronic device monitors the network condition varying in real time and thus detects the optimal network to access.

When determining that the packet service status changes in step 405, the electronic device returns to step 403. When determining no packet service status change in step 405, the electronic device finishes this process.

When the networks supported by the at least two SIM cards do not include the network with the fastest data rate, the electronic device can determine whether the networks supported by the at least two SIM cards include the network with the greatest signal strength in step 406. More specifically, when there is little difference in the data rates of any access to one of the networks accessible by the at least two SIM cards, the electronic device can determine which network exhibits the greater signal strength.

Upon detecting the network with the greatest signal strength in step 406, the electronic device can access the network with the greatest signal strength in step 407. For example, it is assumed that the electronic device includes first, second, and third SIM cards and the SIM cards can access first, second, and third networks respectively. It is also assumed that the electronic device monitors the network with the fastest data rate among the first, second, and third networks, and the second network and the third network exhibit the higher data rates than the first network. On these assumptions, provided that the second network and the third network exhibit the similar data rates within the set range, the electronic device can determine which network exhibits the greater signal strength. Provided that the second network exhibits the greater signal strength than the third network, the electronic device can access the second network.

The electronic device accessing the network with the greatest signal strength repeats the step 405 to determine whether the packet service status changes. When the network automatic switch mode is not set in step 402, the electronic device can access the network selected from the networks supported by the at least two SIM cards in step 408. More specifically, when the network manual switch mode is set, the electronic device can access any one network selected according to the user's selection.

In step 409, the electronic device can determine whether the network access changes. In detail, the electronic device can determine whether the access of the network selected by the user changes. That is, the electronic device can determine whether the user changes the access to any one of the accessible networks.

Upon determining the network access change, the electronic device can access the changed network in step 410. Next, the electronic device finishes this process. By contrast, when detecting no network access change, the electronic device repeats step 409.

Figure 5:
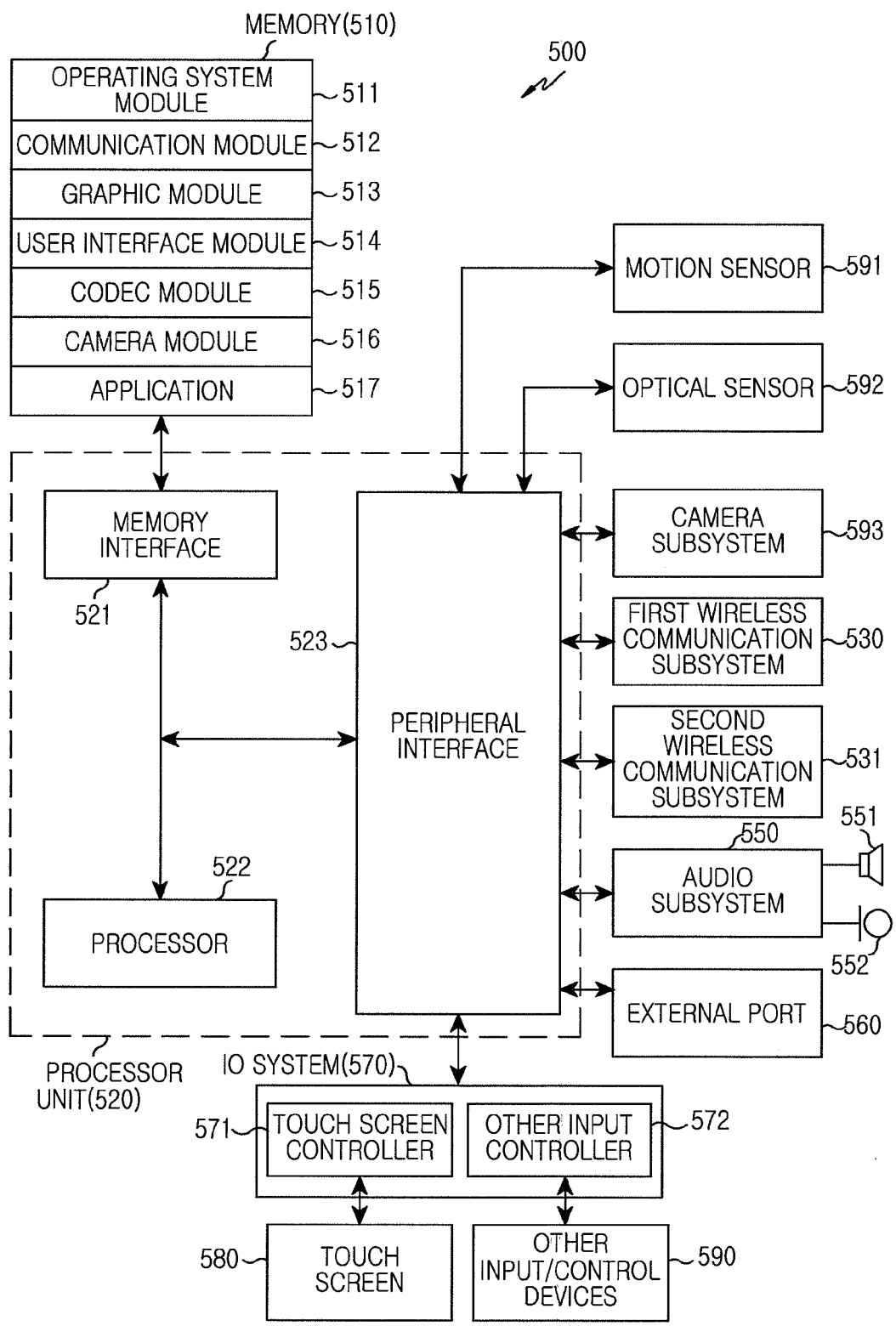
FIG. 5 illustrates the electronic device according to an embodiment of the present disclosure.

FIG. 5 is a block diagram of the electronic device according to an embodiment of the present disclosure. The electronic device 500 can be a portable electronic device such as portable terminal, mobile phone, mobile pad, media player, tablet computer, handheld computer, or Personal Digital Assistant (PDA). The electronic device 500 can be a portable electronic device combining two or more functions of those devices.

The electronic device 500 includes a memory 510, a processor unit 520, a first wireless communication subsystem 530, a second wireless communication subsystem 531, an external port 560, an audio subsystem 550, a speaker 551, a microphone 552, an Input Output (IO) system 570, a touch screen 580, and other input or control devices 590. A plurality of memories 510 and a plurality of external ports 560 can be used.

The processor unit 520 can include a memory interface 521, one or more processors 522, and a peripheral interface 523. In some cases, the processor unit 520 can be referred to as the processor. When detecting, the network satisfying a handover condition, the processor unit 520 switches the SIM card connection to any one SIM card accessible to the network satisfying the handover condition among the at least two SIM cards. The processor unit 520 determines that the current operation is not in the sleep mode, determines whether the network automatic switch mode is set, and confirms that the network automatic switch mode is set. The processor unit 520 connects any one SIM card selected from the at least two SIM cards, determines whether the connection status of the connected SIM card changes, and confirms the access to the network accessible by the changed SIM card when determining the connection status change. When detecting the network with the greatest signal strength, the processor unit 520 switches the SIM card connection to any one SIM card accessible to the network with the greatest signal strength among the at least two SIM cards.

The processor 522 performs various functions for the electronic device 500 by running various software programs, and processes and controls voice communication and data communication. In addition to such typical functions, the processor 522 also executes particular software modules (instruction sets) stored in memory 510 and performs various particular functions corresponding to the modules. That is, the processor 522 carries out methods according to embodiments of the present disclosure in association with the software modules stored in the memory 510.

The processor 522 can include one or more data processors, an image processor, or a CODEC. The data processor, the image processor, or the CODEC can be separately provided. Alternatively, the processor 522 can include a plurality of processors for performing different functions. The peripheral interface 523 connects the IO subsystem 570 and various peripherals of the electronic device 500 to the processor 522 and the memory 510 (through the memory interface).

The various components of the electronic device 500 can be coupled using one or more communication buses or one or more stream lines.

The external port 560 is used to connect the portable electronic device (not shown) to the other electronic device directly or indirectly via a network (e.g., Internet, intranet, and wireless LAN). The external port 560 can be, for example, but not limited to, a Universal Serial Bus (USB) port or a FIREWIRE port.

A motion sensor 591 and an optical sensor 592 are coupled to the peripheral interface 523 to allow various functions. For example, the motion sensor 591 and the optical sensor 592 are coupled to the peripheral interface 523 to detect a motion of the electronic device and the light from the outside. Besides these, a positioning system and other sensors such as temperature sensor or bionic sensor can be coupled to the peripheral interface 523 to perform their functions.

A camera subsystem 593 can perform camera functions such as photo and video clip recording.

The optical sensor 592 can employ a Charged Coupled Device (CCD) or a Complementary Metal-Oxide Semiconductor (CMOS) device.

The communication function is conducted through the one or more wireless communication subsystems 530 and 531. The wireless communication subsystems 530 and 531 can include radio frequency receiver and transmitter and/or optical (e.g., infrared light) receiver and transmitter. The first wireless communication subsystem 530 and the second wireless communication subsystem 531 can be distinguished based on a communication network of the electronic device 500. For example, the communication network can include a communication subsystem designed to operate over, but not limited to, a Global System for Mobile communication (GSM) network, an Enhanced Data GSM Environment (EDGE) network, a Code Division Multiple Access (CDMA) network, a W-CDMA network, a Long Term Evolution (LIE) network, an Orthogonal Frequency Division Multiple Access (OFDMA) network, a Wireless Fidelity (Wi-Fi) network, a WiMax network and/or a Bluetooth network. The first wireless communication subsystem 530 and the second wireless communication subsystem 531 can be integrated into a single wireless communication subsystem.

The audio subsystem 550 can be coupled to the speaker 551 and the microphone 552 to process audio stream input and output such as voice recognition, voice reproduction, digital recording, and telephone function. That is, the audio subsystem 550 communicates with the user through the speaker 551 and the microphone 552. The audio subsystem 550 receives a data signal through the peripheral interface 523 of the processor unit 520 and converts the received data signal to an electric signal. The converted electric signal is fed to the speaker 551. The speaker 551 converts the electric signal to a sound wave audible by the user and outputs the sound wave. The microphone 552 converts the sound wave from the user or other sound sources to an electric signal. The audio subsystem 550 receives the converted electric signal from the microphone 552. The audio subsystem 550 converts the received electric signal to the audio data signal and sends the converted audio data signal to the peripheral interface 523. The audio subsystem 550 can include an attachable and detachable ear phone, head phone, or head set.

The IO subsystem 570 can include a touch screen controller 571 and/or an other input controller 572. The touch screen controller 571 can be coupled to the touch screen 580. The touch screen 580 and the touch screen controller 571 can detect the contact and the motion or their abortion using, but not limited to, capacitive, resistive, infrared and surface sound wave techniques for determining one or more contact points with the touch screen 580 and a multi-touch detection technique including various proximity sensor arrays or other elements. The other input controller 572 can be coupled to the other input/control devices 590. The other input/control devices 590 can employ one or buttons, a rocker switch, a thumb wheel, a dial, a stick, and/or a pointer such as stylus.

The touch screen 580 provides an I/O interface between the electronic device 500 and the user. That is, the touch screen 580 forwards the user's touch input to the electronic device 500. The touch screen 580 is a medium for displaying the output of the electronic device 500 to the user. That is, the touch screen 580 represents a visual output to the user. Such a visual output can be represented as text, graphic, video, and their combination.

The touch screen 580 can employ various displays, examples of which include, but are not limited to, Liquid Crystal Display (LCD), Light Emitting Diode (LED), Light emitting Polymer Display (LPD), Organic LED (OLED), Active Matrix OLED (AMOLED) or Flexible LED (FLED).

The memory 510 can be coupled to the memory interface 521. The memory 510 can include fast random access memory (RAM) such as one or more magnetic disc storage devices and/or non-volatile memory, one or more optical storage devices, and/or a flash memory (e.g., NAND and NOR).

The memory 510 stores software. Software components include an operating system module 511, a communication module 512, a graphic module 513, a user interface module 514, a MPEG module 515, a camera module 516, and one or more application modules 517. The modules being the software components can be represented as a set of instructions, and thus the module can be referred to as an instruction set. Also, the module can be referred to as a program. The operating system software 511 (the embedded operating system such as WINDOWS, LINUX, Darwin, RTXC, UNIX, OS X, or VxWorks) includes various software components for controlling general system operations. These include, e.g., memory management and control, storage hardware (device) control and management, and power control and management. The operating system software 511 processes normal communication between various hardware (devices) and software components (modules).

The communication module 512 allows communication with the other electronic device such as computer, server, and/or portable terminal, through the wireless communication subsystems 530 and 531 or the external port 560. The communication module 512 monitors whether the networks accessible by the at least two SIM cards include the network satisfying the handover condition, and monitors whether the networks accessible by the at least two SIM cards include the network with the greatest signal strength.

The graphic module 513 includes various software components for providing and displaying graphics on the touch screen 580. The term 'graphics' encompasses text, web page, icon, digital image, video, and animation.

The user interface module 514 includes various software components relating to a user interface. The user interface module 514 is involved in the status change of the user interface and the condition of the user interface status change.

The CODEC module 515 can include software components relating to video file encoding and decoding. The CODEC module 515 can include a video stream module such as MPEG module and/or H204 module. The CODEC module 515 can include various audio file CODEC modules for AAA, AMR, and WMA. The CODEC module 515 includes instruction sets corresponding to the methods of the present disclosure as described herein.

The camera module 516 includes camera related software components allowing camera related processes and functions.

The application module 517 includes a browser, an e-mail, an instant message, a word processing, keyboard emulation, an address book, a touch list, a widget, Digital Right Management (DRM), voice recognition, voice reproduction, a position determining function, and a location based service.

The various functions of the electronic device 500 as stated above and to be explained, can be executed by hardware and/or software and/or their combination including one or more stream processing and/or Application Specific Integrated Circuits (ASICs).

As set forth above, the electronic device and method for changing the network connection can monitor the network for enhancing the packet service speed in real time and thus access the optimal network.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method of operating an electronic device for accessing different networks using at least two Subscriber Identity Module (SIM) cards, comprising:
   monitoring the different networks accessible by the at least two SIM cards based on a handover condition;
   detecting one network satisfying the handover condition based on the monitoring; and
   switching SIM card connection to one SIM card accessible to the one network between the at least two SIM cards,
   wherein the one network satisfying the handover condition is a network with a greatest signal strength when the data rates of the different networks are substantially identical.

2. The method of claim 1, wherein the at least two SIM cards are registered to access the networks supporting different packet services.

3. The method of claim 1, wherein the network satisfying the handover condition is a network with a fastest data rate among the networks accessible by the at least two SIM cards.

4. The method of claim 1, wherein the network supports a packet service.

5. The method of claim 1, further comprising:
   confirming that a current operation does not enter a sleep mode.

6. The method of claim 1, further comprising:
   detecting whether a network automatic switch mode is set.

7. The method of claim 6, further comprising, when the network automatic switch mode is detected not to be set:
   determining whether connection status of the connected SIM card changes; and
   when detecting a change of the connection status, confirming the access to the network accessible by the switched SIM card.

8. The method of claim 1, further comprising, when detecting no network satisfying the handover condition:
   detecting a network with a greatest signal strength, switching the SIM card connection to a SIM card accessible to the network with the greatest signal strength among the at least two SIM cards.

9. The method of claim 1, wherein the network satisfying the handover condition is a network with a greatest signal strength among the networks accessible by the at least two SIM cards.

10. An electronic device for accessing different networks using at least two Subscriber Identity Module (SIM) cards, comprising:
    a communication module configured to monitor the different networks accessible by the at least two SIM cards comprise one network that satisfies a handover condition; and
    a processor unit configured, to detect the one network satisfying the handover condition based on the monitoring, and to switch SIM card connection to one SIM card accessible to the one network satisfying the handover condition among the at least two SIM cards,
    wherein the one network satisfying the handover condition is a network with a greatest signal strength when the data rates of the different networks are substantially identical.

11. The electronic device of claim 10, wherein the at least two SIM cards are registered to access the networks supporting different packet services.

12. The electronic device of claim 10, wherein the network satisfying the handover condition is a network with a fastest data rate among the networks accessible by the at least two SIM cards.

13. The electronic device of claim 10, wherein the network supports a packet service.

14. The electronic device of claim 10, wherein a processor unit is configured not to switch the SIM card connection when a current operation does is under a sleep mode.

15. The electronic device of claim 10, wherein the processor unit is configured to determine whether a network automatic switch mode is set, and determine that the network automatic switch mode is set.

16. The electronic device of claim 15, wherein the processor unit is configured, when detecting a change of the connection status, to confirm the access to the network accessible by the switched SIM card.

17. The electronic device of claim 10, wherein the communication module monitors whether the networks accessible by the at least two SIM cards comprise a network with a greatest signal strength, and
when detecting the network with the greatest signal strength, the processor unit switches the SIM card connection to one SIM card accessible to the network of the greatest signal strength among the at least two SIM cards.

18. The electronic device of claim 10, wherein the network satisfying the handover condition is a network with a greatest signal strength among the networks accessible by the at least two SIM cards.

* * * * *